United States Patent Office 3,515,749
Patented June 2, 1970

3,515,749
AMINO ACID DERIVATIVES
Josef Fried, Chicago, Ill., and John Krapcho, Somerset, N.J., assignors to E. R. Squibb & Sons, Inc., New York, N.Y., a corporation of Delaware
No Drawing. Continuation-in-part of application Ser. No. 269,150, Mar. 29, 1963. This application May 17, 1967, Ser. No. 639,026
Int. Cl. C07c *161/00, 101/44*
U.S. Cl. 260—516        10 Claims

ABSTRACT OF THE DISCLOSURE

The invention relates to new chemical compounds of the general formula

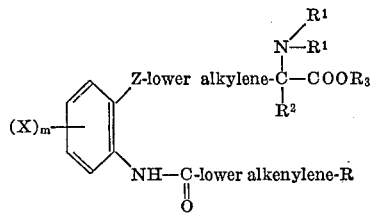

and to salts of these compounds which are useful as antihypertensive agents and disinfectants.

---

This application is a continuation-in-part of application Ser. No. 269,150, filed Mar. 29, 1963, now abandoned.

This invention relates to novel amino acid derivatives of the formula (I)

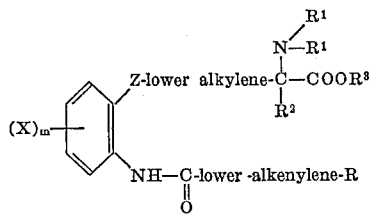

and to acid addition salts, ammonium, alkali metal and alkaline earth metal salts thereof.

The symbols in Formula I have the following meanings:

R represents lower alkyl, $(X)_m$-phenyl, furyl, thienyl or piperonyl.
$R^1$, $R^2$ and $R^3$ each represents hydrogen or lower alkyl.
X represents hydrogen, halo, lower alkyl, lower alkoxy, trihalomethyl, nitro or amino.
Z represents oxa (—O—) or thia (—S—).
$m$ represents 1, 2 or 3.

The lower alkyl groups represented by R, $R^1$, $R^2$, $R^3$ and X include straight and branched chain saturated aliphatic groups such as methyl, ethyl, propyl, isopropyl, butyl, isobutyl, t-butyl, amyl, isoamyl, hexyl and the like. Methyl and ethyl are preferred. The lower alkylene groups are of the same type. The lower alkoxy groups contain alkyl groups of the same character attached to the oxygen atoms.

The unsaturated, lower alkenylene, groups are divalent straight or branched chain groups containing one carbon to carbon double bond illustrated by the following:

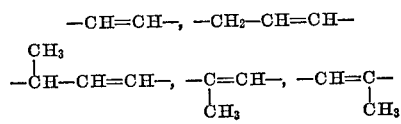

or the like.

Each of the four halogens is contemplated by the terms "halo" and "trihalomethyl," but in the case of the halogens themselves chlorine and bromine are preferred while trifluoromethyl is the preferred trihalomethyl group.

R represents a phenyl group or a phenyl group which contains one to three substituents represented by the symbol X. Illustrative of the substituted phenyl groups are the following: o-, m-, and p-chlorophenyl, o-, m- and p-bromophenyl, o-, m- and p-nitrophenyl, 3,4-dinitrophenyl, 2,5-dichlorophenyl, 2,3-dibromophenyl, 3,4-dichlorophenyl, o-, m- and p-tolyl, xylyl, mesityl, p-methoxyphenyl, p-ethoxyphenyl, o-, m- and p-trifluoromethylphenyl, o-, m- and p-trichloromethylphenyl, 3,4,5-trimethoxyphenyl and 3-aminophenyl.

The preferred members of the class defined by Formula I are those wherein X is hydrogen, Z is thia, R is phenyl, $R^1$ is hydrogen or lower alkyl, especially methyl, $R^2$ is hydrogen, $R^3$ is hydrogen, $m$ represents 1, the alkylene group has 1 or 2 carbon atoms, especially 2, and the lower alkenylene group has 2 carbon atoms.

The new compounds of Formula I are produced by reacting a compound of the formula (II)

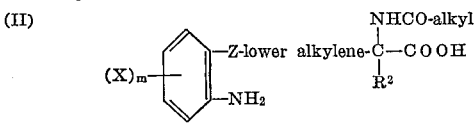

with a compound of the formula (III)

in an aqueous solution containing one equivalent of alkali or in an inert solvent such as chloroform, benzene, ether or the like at a temperature from about room temperature to reflux temperature to give a compound of the formula (IV)

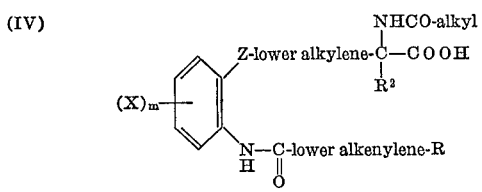

Hydrolysis of this material under mild conditions yields I.

Alternately, a compound of the formula (V)

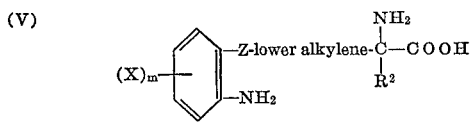

in the form of its copper salt is reacted with III to give the copper salt of I (treatment with $H_2S$) precipitates the copper as CuS, the latter filtered and the filtrate evaporated to give I.

Another procedure useful in the preparation of one of the preferred compounds of this invention involves the reaction of an alkali metal salt, preferably the potassium salt, of (VI)

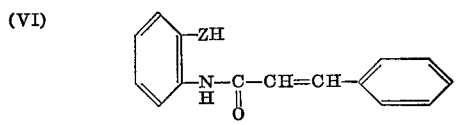

with

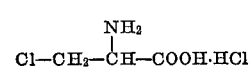

in the presence of alkali to give (VII)

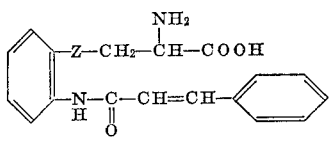

The symbols used above are the same as in Formula I and hal refers to halogen, preferably chlorine or bromine.

The compounds of this invention occur in the form of optically active isomers and racemic mixtures thereof. The individual isomers may be obtained by use of the appropriate optically active amino acid in the synthesis or by resolution of the racemic mixture by conventional procedures. All forms are within the purview of this invention, but, in general, the L-isomers are preferred.

The bases of Formula I form acid addition salts by reaction with the common inorganic and organic acids. Such inorganic salts as the hydrohalides, e.g., hydrobromide, hydrochloride, hydroiodide, sulfates, nitrates, phosphates, etc., and organic salts as acetate, oxalate, tartrate, maleate, citrate, succinate, benzoate, ascorbate, salicylate, theophyllinate, camphorsulfonate, alkanesulfonate, e.g., methanesulfonate, benzenesulfonate, toluenesulfonate and the like, are also within the scope of the invention.

The sodium, potassium or ammonium salts of these amino acid compounds are obtained by dissolving the acid in an equivalent of aqueous alkali and removing the water under reduced pressure. The lower alkyl esters are obtained by conventional esterification procedures or by initially utilizing a halogen derivative of an amino acid ester.

The compounds of this invention are therapeutically active substances which possess serotonin inhibitory and hypotensive activities and are also decarboxylase inhibitors. They are useful in the treatment of conditions such as hypertension. They may be administered orally or parenterally, at a dosage of about 0.1 to 10 mg./kg. daily in divided doses, in the form of tablets, capsules, elixirs, injectables or the like by incorporating the appropriate dosage of the base of Formula I or a physiologically acceptable acid addition salt, ammonium salt, alkali metal salt or alkaline earth metal salt thereof in a conventional vehicle according to accepted pharmaceutical practice. They are also bacteriostats, i.e., useful as disinfectants at concentrations of about 0.1 to 10% (base or salt form) in aqueous solution or suspension.

The following examples are illustrative of the invention. All temperatures are expressed on the centigrade scale.

EXAMPLE 1

3-(2-cinnamamidophenylthio)-DL-alanine (a) N-ACETYL-3-(2-AMINOPHENYLTHIO)-DL-ALANINE The interaction of 2-aminobenzenethiol with α-acetamidoacrylic acid according to the procedure described in the J. Org. Chem., 23, 1253 (1958), gives N-acetyl-(2-aminophenylthio)-DL-alanine.

(b) N-ACETYL-3-(2-CINNAMAMIDOPHENYLTHIO)-DL-ALANINE

A solution of the material from part (a) in a solution of one equivalent of alkali is reacted with an equivalent quantity of cinnamoyl chloride to give N-acetyl-(2-cinnamamidophenylthio)-DL-alanine.

(c) 3-(2-CINNAMAMIDOPHENYLTHIO)-DL-ALANINE

A solution of material from part (b) in ethanol is treated with dilute sulfuric acid and the resulting mixture is refluxed for fifteen minutes. The mixture is partially concentrated under reduced pressure. The residue is adjusted to pH 7 with ammonium hydroxide and the product which precipitates from the mixture is filtered, washed with water and dried.

EXAMPLE 2

3-(4-chloro-2-cinnamamidophenylthio)-DL-alanine

This material is obtained according to the same procedure described in Example 1 except the 4-chloro-2-aminobenzenethiol is substituted for 2-aminobenzenethiol in part (a).

EXAMPLE 3

3-(2-cinnamamido-4-methoxyphenylthio)-DL-alanine

This material is obtained according to the same procedure described in Example 1 except that 4-methoxy-2-aminobenzenethiol is substituted for 2-aminobenzenethiol in part (a).

By substituting for the cinnamoyl chloride in part (b) of Example 1 the acid chloride of the following acids: crotonic, α-methylcinnamic, 4-chlorocinnamic, 3,4,5-trimethoxycinnamic, β-(2-thiophene)acrylic, β-(2-furan)-acrylic, and β-piperonylacrylic acids, there is obtained, respectively:

| Compound: | Example |
|---|---|
| 3-(2-crotonamidophenylthio)-DL-alanine | 4 |
| 3-(2-α-methylcinnamamidophenylthio)-DL-alanine | 5 |
| 3-[2-(4-chlorocinnamamido)phenylthio]-DL-alanine | 6 |
| 3-[2-(3,4,5-trimethoxycinnamamido)phenylthio] DL-alanine | 7 |
| 3-{2-[β-(2-thiophene)acrylamido]phenylthio} DL-alanine | 8 |
| 3-{2-[β-(2-furan)acrylamido]phenylthio}-DL-alanine | 9 |
| 3-[2-(β-piperonylacrylamido)phenylthio]-DL-alanine | 10 |

EXAMPLE 11

2-amino-4-(2-cinnamamidophenylthio)-L-butyric acid (a) 2-AMINO-4-(2-NITROPHENYLTHIO)-L-BUTYRIC ACID Interaction of L-homocystine with diazotized o-nitroaniline in the presence of cuprous oxide (by following the procedure with L-cystine described in J. Chem. Soc., 1962, p. 608) yields 2-amino-4-(2-nitrophenylthio)-L-butyric acid.

(b) 2-ACETYLAMINO-4-(3-NITROPHENYLTHIO)-L-BUTYRIC ACID

The material from part (a) is reacted with acetic anhydride according to the procedure described in the reference method to give 2-acetylamino-4-(2-nitrophenylthio)-L-butyric acid.

(c) 2-ACETYLAMINO-4-(2-AMINOPHENYLTHIO)-L-BUTYRIC ACID

The material from part (b) is dissolved in acetic acid and treated with zinc powder to give 2-acetylamino-4-(2-aminophenylthio)-L-butyric acid.

(d) 2-ACETYLAMINO-4-(2-CINNAMAMIDOPHENYLTHIO)-L-BUTYRIC ACID

Interaction of the material from part (c) with an equivalent quantity of cinnamoyl chloride in the presence of one equivalent of alkali gives 2-acetylamino-4-(2-cinnamamidophenylthio)-L-butyric acid.

(e) 2-AMINO-4-(2-CINNAMAMIDOPHENYLTHIO)-L-BUTYRIC ACID

Hydrolysis of the material from part (d) according to the procedure described in part (c) of Example 1 gives 2-amino-4-(2-cinnamamidophenylthio)-L-butyric acid.

EXAMPLE 12

3-(2-cinnamamidophenoxy)-DL-alanine (a) 3-(2-NITROPHENOXY)-DL-ALANINE HYDROCHLORIDE A methanol solution of o-nitrophenol containing three equivalents of potassium hydroxide are treated with one equivalent of 3-chloro-DL-alanine hydrochloride [J. Biol.

Chem. 179, 529 (1949)], and the mixture is refluxed for one hour. The solvent is evaporated and the residue dissolved in water. The cold aqueous solution is neutralized to pH 6 to precipitate the 3-(2-nitrophenoxy)-DL-alanine hydrochloride.

(b) 3-(2-AMINOPHENOXY)-DL-ALANINE

The material from part (a) is dissolved in ethanol and treated with hydrogen in the presence of palladium-carbon catalyst. After absorption of the theoretical quantity of hydrogen, the catalyst is filtered and the solvent removed under reduced pressure to give 3-(2-aminophenoxy)-DL-alanine.

(c) 3-(2-CINNAMAMIDOPHENOXY)-DL-ALANINE

An aqueous suspension of the material from part (b) is treated with copper carbonate and the resulting solution of the copper salt is treated with cinnamoyl chloride. The resulting mixture is treated with hydrogen sulfide and the precipitated copper sulfide is filtered. The filtrate is concentrated under reduced pressure to give 3-(2-cinnamamidophenoxy)-DL-alanine.

EXAMPLE 13

3-(2-cinnamamidophenylthio)-L-alanine (a) 3-CHLORO-L-ALANINE

The methyl ester of L-serine is treated with phosphorus pentachloride and then hydrochloric acid [according to the procedure described in J. Biol. Chem. 179, 529 (1949)] to give 3-chloro-L-alanine.

(b) 3-(2-CINNAMAMIDOPHENYLTHIO)-L-ALANINE

An equivalent quantity of material from part (a) is added to a methanol solution containing three equivalents of potassium hydroxide and one equivalent of 2-cinnamamidothiophenol (J. Chem. Soc. 1927, p. 2738). The mixture is refluxed for three hours and the solvent removed under reduced pressure. The residue is dissolved in water, neutralized to pH 6 and the product, 3-(2-cinnamamidophenylthio)-L-alanine, is filtered and dried.

EXAMPLE 14

2-methyl-3-(2-cinnamamidophenylthio)-DL-alanine

By utilizing the procedure described in Example 13 but substituting the methyl ester of α-methyl-DL-serine for the methyl ester of L-serine in part (a) there is obtained 2-methyl-3-(2-cinnamamidophenylthio)-DL-alanine.

EXAMPLE 15

3-(2-cinnamamidophenylthio)-N-methyl-DL-alanine

By substitution of the methyl ester of DL-N-methylserine (J. Chem. Soc. 1949, p. 1968) for the methyl ester of L-serine in part (a) of Example 13, 3-(2-cinnamamidophenylthio)-N-methyl-DL-alanine is obtained.

EXAMPLE 16

3-(2-cinnamamidophenylthio)-N,N-diethyl-DL-alanine

By substitution of the methyl ester of DL-N,N-diethylserine (J. Chem. Soc. 1949, p. 1968) for the methyl ester of L-serine in part (a) of Example 13, 3-(2-cinnamamidophenylthio)-N,N-diethyl-DL-alanine is obtained.

EXAMPLE 17

3-(2-cinnamamidophenylthio)-DL-alanine, sodium salt

To an aqueous suspension of material from part (c) of Example 1 is added one equivalent of 1 N sodium hydroxide solution. The resulting solution is evaporated to dryness at reduced pressure to give the sodium salt of 3-(2-cinnamamidophenylthio)-DL-alanine.

EXAMPLE 18

3-(2-cinnamamidophenylthio)-DL-alanine, methyl ester

By substituting 3-chloro-DL-alanine, methyl ester hydrochloride, for the 3-chloro-L-alanine in part (b) of Example 13, there is obtained 3-(2-cinnamamidophenylthio)-DL-alanine, methyl ester.

EXAMPLE 19

2-amino-4-(2-cinnamamidophenoxy)-DL-butyric acid

By substituting an equivalent quantity of 4-chloro-2-amino butyric acid hydrochloride for the 3-chloro-DL-alanine hydrochloride in part (a) of Example 12, 2-amino-4-(2-cinnamamidophenoxy)-DL-butyric acid is obtained.

EXAMPLE 20

2-amino-4-(2-cinnamamidophenoxy)-DL-butyric acid, ethyl ester

By substituting an equivalent quantity of 4-chloro-2-aminobutyric acid, ethyl ester hydrochloride, for the 3-chloro-DL-alanine hydrochloride in part (a) of Example 12, 2-amino-4-(2-cinnamamidophenoxy)-DL-butyric acid, ethyl ester is obtained.

EXAMPLE 21

3-(2-p-nitrocinnamamidophenoxy)-DL-alanine

By substituting an equivalent quantity of p-nitrocinnamoyl chloride for the cinnamoyl chloride in part (c) of Example 12, 3-(2-p-nitrocinnamamidophenoxy)-DL-alanine is obtained.

EXAMPLE 22

3-(2-p-aminocinnamamidophenoxy)-DL-alanine

The material from Example 21 is dissolved in ethanol and treated with hydrogen in the presence of palladium-carbon catalyst. After absorption of the theoretical quantity of hydrogen, the catalyst is filtered and the solvent removed under reduced pressure to give 3-(2-p-aminocinnamamidophenoxy)-DL-alanine.

EXAMPLE 23

3-(2-cinnamamido-4-trifluoromethylphenylthio)-DL-alanine

By substituting 2-amino-4-trifluoromethylbenzenethiol for the 2-aminobenzenethiol in part (a) of Example 1, 3 - (2 - cinnamamido - 4 - trifluoromethylphenylthio)-DL-alanine is obtained.

EXAMPLE 24

3-(2-cinnamamido-4,5-dimethylphenylthio)-DL-alanine

By substituting 2-amino-4,5-dimethylbenzenethiol for the 2-aminobenzenethiol in part (a) of Example 1, 3-(2-cinnamamido-4,5-dimethylphenylthio)-DL-alanine is obtained.

EXAMPLE 25

3-(2-m-bromocinnamamidophenylthio)-DL-alanine

By substituting m-bromocinnamoyl chloride for the cinnamoyl chloride in part (b) of Example 1, 3-(2-m-bromocinnamamidophenylthio)-DL-alanine is obtained.

EXAMPLE 26

3-[2-(2,6-dichlorocinnamamido)phenylthio]-DL-alanine

By substituting 2,6-dichlorocinnamoyl chloride for cinnamoyl chloride in part (b) of Example 1, 3-[2-(2,6-dichlorocinnamamido)phenylthio]-DL-alanine is obtained.

What is claimed is:

1. A member selected from the group consisting of compounds of the formula

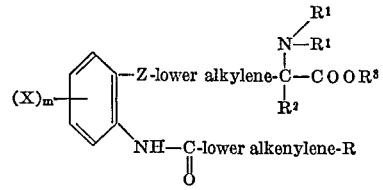

wherein R is $(X)_m$-phenyl; $R^1$, $R^2$ and $R^3$ each is hydrogen or lower alkyl; X is hydrogen, halo, lower alkyl, lower alkoxy, trihalomethyl, nitro or amino; Z is oxa or thia; and m is 1, 2 or 3; and acid addition, ammonium, alkali metal and alkaline earth metal salts thereof.

2. A compound as in claim 1 wherein R is phenyl, each $R^1$ is lower alkyl, $R^2$ and $R^3$ each is hydrogen, X is hydrogen, Z is thia and m is 1.

3. A compound as in claim 1, wherein R is phenyl, each $R^1$ is lower alkyl, $R^2$ and $R^3$ each is hydrogen, X is hydrogen, Z is oxa and m is 1.

4. A compound as in claim 1 wherein R is phenyl, each $R^1$, $R^2$ and $R^3$ is hydrogen, X is hydrogen, Z is thia and m is 1.

5. A compound as in claim 4 wherein the lower alkylene and lower alkenylene group each has 2 carbon atoms.

6. A compound as in claim 1 wherein R is phenyl, each $R^1$, $R^2$ and $R^3$ is hydrogen, X is 4-chloro, Z is thia, m is 1 and the lower alkylene and lower alkenylene group each has 2 carbon atoms.

7. A compound as in claim 1 wherein R is phenyl, each $R^1$, $R^2$ and $R^3$ is hydrogen, X is 4-methoxy, Z is thia, m is 1 and the lower alkylene and lower alkenylene group each has 2 carbon atoms.

8. A compound as in claim 1 wherein R is 3,4,5-trimethoxyphenyl, each $R^1$, $R^2$ and $R^3$ is hydrogen, X is hydrogen, Z is thia, m is 1 and the lower alkylene and lower alkenylene group each has 2 carbon atoms.

9. A compound as in claim 4 wherein the lower alkylene group has 3 carbon atoms and the lower alkenylene group has 2 carbon atoms.

10. A compound as in claim 1 wherein R is phenyl, each $R^1$, $R^2$ and $R^3$ is hydrogen, X is hydrogen, Z is oxa, m is 1 and the lower alkylene and lower alkenylene group each has 2 carbon atoms.

References Cited

UNITED STATES PATENTS

| | | | |
|---|---|---|---|
| 3,398,187 | 8/1968 | Drain | 260—247.2 |
| 3,238,203 | 3/1966 | Krapcho | 260—519 |

LORRAINE A. WEINBERGER, Primary Examiner

E. J. GLEIMAN, Assistant Examiner

U.S. Cl. X.R.

260—470, 471, 519, 332.2, 347.2, 340.9, 501.11, 501.12; 424—278, 285, 309, 319